United States Patent
Mazoyer et al.

(10) Patent No.: US 9,626,873 B2
(45) Date of Patent: Apr. 18, 2017

(54) METHOD, SYSTEM AND COMPUTER PROGRAM FOR PROVIDING, ON A HUMAN-MACHINE INTERFACE, DATA RELATING TO AN ASPECT OF THE OPERATION OF AN AIRCRAFT

(71) Applicant: THALES, Neuilly-sur-Seine (FR)

(72) Inventors: Patrick Mazoyer, Valence (FR); Antoine Lacombe, Valence (FR); Franåois Coulmeau, Valence (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 14/310,940

(22) Filed: Jun. 20, 2014

(65) Prior Publication Data

US 2014/0375479 A1 Dec. 25, 2014

(30) Foreign Application Priority Data

Jun. 21, 2013 (FR) ..................................... 13 01454

(51) Int. Cl.
*G08G 5/00* (2006.01)
*G01C 23/00* (2006.01)

(52) U.S. Cl.
CPC ........... *G08G 5/0021* (2013.01); *G01C 23/00* (2013.01); *G08G 5/003* (2013.01); *G08G 5/0047* (2013.01); *G08G 5/0052* (2013.01)

(58) Field of Classification Search
CPC .... G01C 23/005; G08G 5/0021; G08G 5/003; G08G 5/0047; G08G 5/0039; G08G 5/0034; G08G 5/0065; G08G 5/025

USPC .... 340/971, 945, 961, 963, 990, 995; 701/3, 701/14, 28; 244/183, 185, 186
See application file for complete search history.

(56) References Cited

U.S. PATENT DOCUMENTS

| | | | |
|---|---|---|---|
| 6,240,341 B1 * | 5/2001 | Snyder | G01C 23/00 345/530 |
| 6,542,796 B1 * | 4/2003 | Gibbs | G01C 23/005 244/183 |
| 2008/0125962 A1 * | 5/2008 | Wipplinger | G01C 23/005 701/533 |
| 2008/0158256 A1 * | 7/2008 | Russell | G06T 7/0026 345/629 |

(Continued)

FOREIGN PATENT DOCUMENTS

| | | |
|---|---|---|
| EP | 1610094 A1 | 12/2005 |
| EP | 2048477 A2 | 4/2009 |

(Continued)

*Primary Examiner* — Mirza Alam
(74) *Attorney, Agent, or Firm* — Baker Hostetler LLP (57) ABSTRACT

A method, system and computer program for providing, on a human-machine interface, data relating to an aspect of the operation of an aircraft and grouped into one and the same area of the interface, the method comprising the following steps. A step of detecting a request to display an aspect of the operation of the aircraft. The method also includes a step of computing a flight situation and generating a consolidated aeroplane situation. A step of associating the elementary data linked to the consolidated aeroplane situation to extract therefrom updated situational data. The method then includes a step of grouping the updated situational data into a plurality of sub-sets to allow display of the data in the display area. Finally the method includes a step of displaying, in the display area, the sub-sets of data.

15 Claims, 6 Drawing Sheets

(56) References Cited

U.S. PATENT DOCUMENTS

| | | | | |
|---|---|---|---|---|
| 2009/0125222 A1* | 5/2009 | McCullough | .......... | G01C 23/00 |
| | | | | 701/120 |
| 2010/0305786 A1* | 12/2010 | Boorman | ............... | G08G 5/025 |
| | | | | 701/16 |
| 2011/0202547 A1* | 8/2011 | Morizet | ............... | G08G 5/0021 |
| | | | | 707/758 |

FOREIGN PATENT DOCUMENTS

| | | | |
|---|---|---|---|
| EP | 2199747 | A2 | 6/2010 |
| EP | 2533227 | A1 | 12/2012 |
| FR | 2910678 | A1 | 6/2008 |
| GB | 2468194 | A1 | 9/2010 |
| WO | 2009002603 | A1 | 12/2008 |

* cited by examiner

| PdV | UTC ▽ | SPD | ALT ▽ | TRK | DIST |
|---|---|---|---|---|---|
| LFB014R | 00:00 | 140 | 500 | | |
|     C145° | | | | 146° | 2 |
| 999 | 00:00 | - | 1450 | | |
|     C145° | | | | 146° | 8 |
| T64 | 00:02 | 250 | 7500 | | |
|     C229° | | | | 108° | 16 |
| INTCPT | 00:05 | 222 | 17500 | | |
|     C275° | | | | 108° | 14 |
| (T/C) | 00:08 | 217 | FL250 | | |
|     C275° | | | | 110° | 15 |
| TALOL | 00:11 | 216 | - | | |
|     TANSA | | | | 110° | 27 |
| TAN | 00:15 | - | - | | |
|     C275° | | | | 110° | 46 |
| AGN | 00:24 | 215 | - | | |
|     UA 34 | | | | 110° | 74 |
| PERIG | 00:37 | 214 | - | | |

ACTIVE / SUMMARY

F-PLN ▽

| FROM | UTC ▽ | SPD | ALT ▽ | TRK | DIST |
|---|---|---|---|---|---|
| SUGOL | 12:05 | 260 | FL190 | 300° | 30NM |
| MEN | 12:13 | 260 | FL190 | 225° | 17NM |
| (T O D) | 12:18 | 260 | FL190 | 225° | 10NM |
| AFRIC | 12:31 | 220 | FL118 | 030° | 22NM |

PERF CRZ ▽

CRZ MODE  MIN TIME ▽

| MODE | MACH | SPD | AT TOD | |
|---|---|---|---|---|
| SELECTED | .-- | 260 | 12:18 | 57NM |
| MANAGED | .80 | --- | 12:15 | 57NM |

OFFSET ▽

OFFSET DIST  5NM   ● LEFT   ○ RIGHT   [CANCEL OFFSET]

F-PLN VIEW

FIG.5

| | TYPE | ALT | PHASE | SPEED |
|---|---|---|---|---|
| ACTIVE / FPLN MISSION | | | | |
| LFBO | ARPT | 410ft | DEP | 135 kts |
| THR RED | 2000 ft | T.O | T.O | |
| ACC ALT | 2500 fr | T.O | T.O | |
| AFRIC | SID END | FL150 | CLB | |
| T O C | CLB END | FL250 | CLB | |
| T O D | CRZ END | FL250 | CRZ | |
| ROYAN | STAR BGN | 18000 ft | DES | |
| SAU | APN BGN | 6000 ft | APP | |
| BDN | FAF | 2000 ft | APP | |
| LFBD | ARPT | 110 ft | ARR | |

METHOD, SYSTEM AND COMPUTER PROGRAM FOR PROVIDING, ON A HUMAN-MACHINE INTERFACE, DATA RELATING TO AN ASPECT OF THE OPERATION OF AN AIRCRAFT

CROSS-REFERENCE TO RELATED APPLICATION

This application claims priority to foreign French patent application No. FR 1301454, filed on Jun. 21, 2013.

FIELD OF THE INVENTION

The invention relates to the field of on-board systems, in particular systems for aiding flight management.

BACKGROUND

In the field of piloting aids, whether they are flight management systems, commonly referred to by the acronym FMS, airport navigation systems, commonly called Onboard Airport Navigation System (OANS), or simply ANS, or even the mission preparation systems commonly called Electronic Flight Bag (EFB), there is a need to display a large number of information items and of varied data relating to the flight plans.

The data are input upstream during the preparation of a flight, for example, or during said flight, via a human-machine interface (HMI) of the FMS. The information that is input or the information that is computed for the flight plan may require the use of several screens to visualize it a posteriori, corresponding to as many different waypoints.

The technical navigating crews of modern aeroplanes are made up of two people, one on each side of the flight deck: a "captain" side and a "first officer" side. Each one views, on his or her HMIs, the pages that interest them. The term "page" refers to a set of data items representing an aspect of the operation of the aircraft. It is generally possible to display, during the execution of the mission, two pages from among the hundred or so possible pages:

- the "flight plan" page which contains the information on the route followed by the aeroplane (list of the next waypoints with their associated predictions of distance, time, altitude, speed, fuel, and wind). The route is divided into segments, themselves composed of points (as described in patent FR2910678).
- the "performance" page which contains the useful parameters for guiding the aeroplane in a short time interval (speed to follow, altitude ceilings, next altitude changes).

The other typical pages available on board are:
the lateral and vertical revision pages which include the following pages:
  - the "initialization" pages for initializing a route and its main parameters
  - the "departure" pages for inputting the departure procedures
  - the "arrival" pages for inputting the arrival procedures
  - the "airways" pages for inputting the list of air highways also known as "airways".
  - the "Alternate" pages for inputting and checking the information on alternate airports
  - the pages of the temporary and secondary flight plans
  - the "DIR TO" page for carrying out a manoeuvre making it possible to directly join a waypoint
  - the page for inputting vertical constraints (altitude, speed, time)
  - the "HOLD" pages making it possible to input the holding stacks
  - the "Weather" pages for inputting wind and temperature information during the various phases of flight
  - the "Offset" pages making it possible to choose a route laterally offset to the left or right of the initial route the information pages which include the following pages:
  - the "Data" pages for displaying data linked to elements of the navigation database according to the ARINC 424 standard: a page for stored Routes, a page for "waypoints", a page for "radio beacons", a page for "airports"
  - the "Status" pages which give the configuration of the aeroplane. There can be ten or so pages of this type.
  - the "location" pages making it possible to know the position of the aeroplane with the various sensors, the accuracy of navigation, the beacons used for navigation etc.
  - the "weight management" pages making it possible to input and to check the weights (empty weight, on-board fuel) and the centre of gravity
  - the "Route Summary" pages making it possible to display a summary of the Route or of the mission.

There is therefore a problem of incompatibility between the number of screens in a cockpit for checking the execution of the mission (1 per member of crew for the text information) and the number of pages that the captain wishes to display. Moreover, due to procedural constraints it is requested, as often as possible, to have a display with one defined page per side (1 captain side and 1 first officer side), during the execution of the mission. Typically, in the absence of modification to the flight plan in progress, the captain side displays the "flight plan" page and the first officer the "performance" page.

The prior art includes the U.S. Pat. No. 6,542,796 by Gibbs, which proposes a system making it possible to mask procedures or make them appear on the page presenting the flight plan. This patent concerns the concatenation of information already present on the "flight plan" page, in 2 or 3 rows, corresponding to the waypoint to which the aircraft is directed, and to the last waypoint to have been crossed through. However, this system does not make it possible to effectively and dynamically concatenate information contained over several pages, concerning the procedure in progress, and the following procedures. Indeed it only allows a single masking of an element (per procedure or per phase).

Also known is patent FR2910678 by the same applicant, which proposes a variant of vertical folding on several levels, but does not allow the concatenation of information originating from different pages.

Therefore these solutions do not allow information corresponding to several pages to be displayed on one and the same screen (one and the same page). Indeed, the current aerospace standards (in particular the ARINC 702 and ARINC661 standards) define for each page a fairly static structure, specific to each page, and do not allow the various pages to be mixed into a single one. Moreover, these solutions do not make it possible to determine the links to be made between the various pages for displaying in a dynamic, effective and intuitive manner for the captain the information necessary in the short, medium and long term on a single page.

The present invention meets this need.

SUMMARY OF THE INVENTION

Advantageously the invention makes it possible to display, on one and the same screen, information corresponding to several pages.

Another subject of the present invention is to offer a summarizer of information correlated by data types for each flight plan and to make it possible to visualize the relevant information on a single summary page of a navigation system, depending on the situation and the requirements of a crew.

Advantageously, the device of the invention will make it possible to strengthen the summary picture of a flight as well as the effectiveness of the captains in the planning and the short-, medium- and long-term monitoring of their flight. Thus flight security is strengthened and savings are made by changes in flight level or redirections avoiding detours.

Advantageously, the present invention can be implemented on any type of transport whether it be in the context of the aerospace, automotive or rail or maritime transport industries.

To obtain the desired results, a method, a device and a computer program product are described.

In particular, a method implemented by computer for providing, on a human-machine interface, data relating to an aspect of the operation of an aircraft and grouped into one and the same area of said interface, the method comprising the steps of:
  detecting a request to display said aspect of the operation of the aircraft;
  identifying elementary data, associated with said selected aspect, and creating links between the identified elementary data;
  computing a flight situation and generating a consolidated aeroplane situation;
  associating the elementary data linked to the consolidated aeroplane situation to extract therefrom updated situational data;
  grouping the updated situational data into a plurality of sub-sets to allow display of said data in said display area,
  displaying, in said display area, the sub-sets of data.

The consolidated aeroplane situation includes all the information on the situation and the environment in which the aeroplane evolves.

The updated situational data are the data extracted from the links database, in relation to a consolidated aeroplane situation. They are sorted by the grouping step to present the most relevant data when there is more data to be displayed than there is space.

Data relating to an aspect of the operation of an aircraft displayed on the same display area of the interface are also known, in the prior art, by the name of information page.

The aspects of the operation of an aircraft are for example flight plan indications, indications of quantity of the various fluids present in the aircraft, etc.

Advantageously the grouping step furthermore makes it possible to remove updated situational data from certain sub-sets when the quantity of updated situational data exceeds the display capacity of the human-machine interface.

Advantageously the grouping step furthermore makes it possible, when the aspect of the operation of an aircraft concerns a flight plan, to display only the data relating to two waypoints of said flight plan, the waypoint that has been reached and the next waypoint.

Advantageously the display step furthermore makes it possible to alert the crew if the quantity of updated situational data exceeds the display capacity of the human-machine interface and to choose the sub-set or sub-sets not to be displayed.

Advantageously the display step makes it possible to offer the display of only the sub-sets whose quantity of updated situational data does not exceed the display capacity of the human-machine interface, taking into account the other sub-sets to be displayed.

The present invention also presents a system for aiding flight management for providing, on a human-machine interface, data relating to an aspect of the operation of an aircraft and grouped into one and the same area of said interface, the system comprising means for implementing the steps of the method.

The present invention also presents a computer program product, said computer program comprising code instructions making it possible to carry out the steps of the method previously presented, when said program is executed on a computer.

BRIEF DESCRIPTION OF THE DRAWINGS

Various aspects and advantages of the invention will become apparent upon reading the description of a preferred but in no way limiting mode of implementation of the invention, with reference to the figures below.

DETAILED DESCRIPTION

Figure 1:
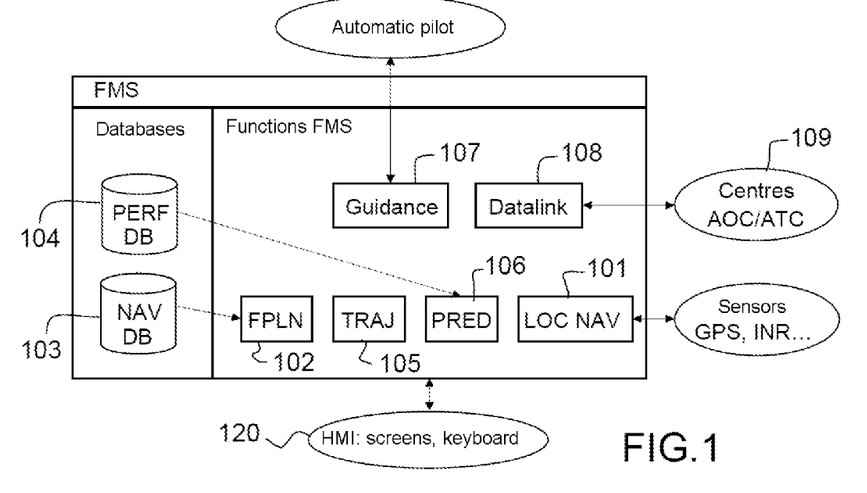
FIG. 1 shows the structure of a flight management system of FMS type, known from the prior art.

FIG. 1 shows an example of the functional modules of a Flight Management System 100 in a preferred implementation of the invention, without being limiting and allowing those skilled in the art to implement variants.

The system 100 possesses a human-machine interface 120 comprising inputting means, for example formed by a keyboard, and display means, for example formed by a display screen, or else simply a touch-sensitive display screen, as well as at least the following functions, described in the ARINC 702 standard, "Advanced Flight Management Computer System", of December 1996:

Navigation (LOCNAV) 101, for carrying out the optimal location of the aircraft depending on the geolocation means 130 such as geo-positioning by satellite or GPS, GALILEO, VHF radio navigation beacons, inertial platforms. This module communicates with the aforementioned geo-location devices;

Flight plan (FPLN) 102, for inputting the geographical elements constituting the skeleton of the route to be followed, such as the points imposed by the departure and arrival procedures, the waypoints, the air highways, commonly denoted "airways";

Navigation database (NAVDB) 103, for constructing geographical routes and procedures on the basis of data included in the bases related to the points, beacons, interception or altitude legs;

Performance database, (PERFDB) 104, containing the aerodynamic and engine parameters of the craft;

Lateral trajectory (TRAJ) 105, for constructing a continuous trajectory on the basis of the points of the flight plan, complying with the aircraft performance and with the confinement constraints (RNP). The lateral trajectory represents the track projected onto the ground that will be followed by the aeroplane (series of straight and curved segments);

Predictions (PRED) 106, for constructing an optimized vertical profile on the lateral trajectory, this profile being composed of estimates of distance, time, altitude, speed, fuel and wind notably on each point, at each change of piloting parameter and at destination, which will be displayed to the crew;

Guidance (GUID) 107, for guiding in the lateral and vertical planes the aircraft on its three-dimensional trajectory, while optimizing its speed, using the information computed by the Predictions 106 function. In an aircraft equipped with an automatic pilot device 110, the latter can exchange information with the guidance module 107;

Digital data link (DATALINK) 108 for exchanging flight information between the Flight plan/Predictions functions and the control centres or the other aircraft 109.

On the basis of the flight plan defined by the captain and the list of the waypoints and the procedures (departure, arrivals, airways, missions), the trajectory is computed as a function of the geometry between the waypoints (currently called LEG) and/or the altitude and speed conditions that are used for computing the turn radius. On this lateral trajectory, the FMS optimizes a vertical trajectory, passing through any altitude, speed and time constraints.

Figure 2:
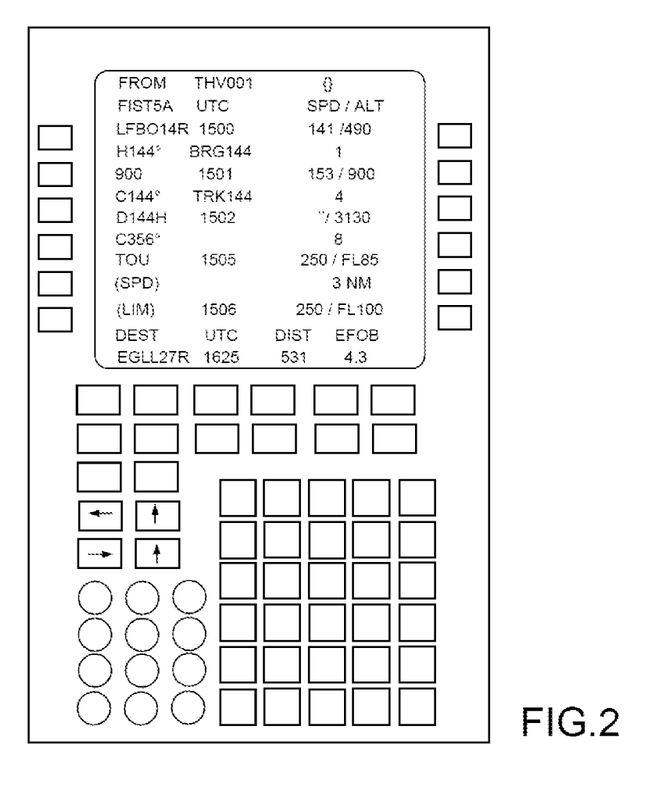
FIG. 2 shows an example of a display of a "flight plan" page in a known human-machine interface.
Figure 3:
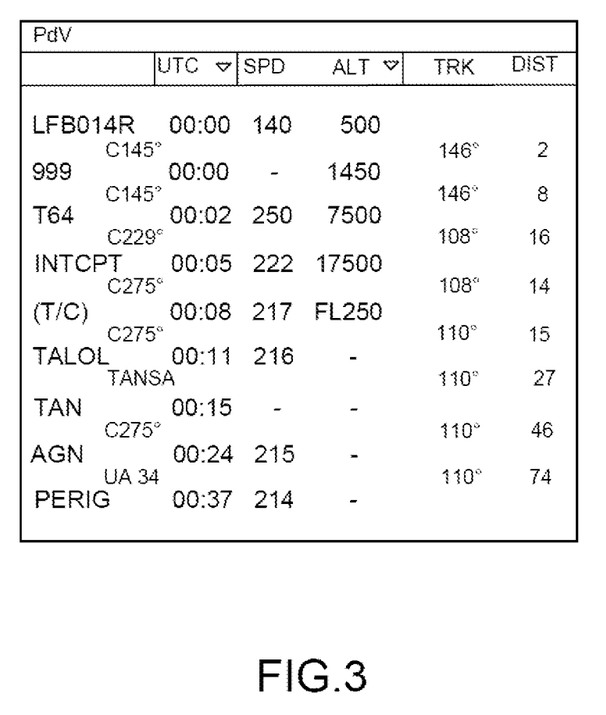
FIG. 3 shows another example of a display of a "flight plan" page.

All the information input or computed by the FMS is grouped into pages. FIGS. 2 and 3 illustrate display examples of a "flight plan" page using known human-machine interfaces. Existing systems make it possible to navigate from page to page, but the size of the screens that according to the technologies make it possible to display between 6 and 20 rows and between 4 and 6 columns, do not meet the need to assess a current and future situation of the flight in a summary fashion. During the execution of a mission, the Flight Plan page ("PdV" in FIG. 3) contains the information on the route followed by the aeroplane such as the list of the next waypoints with their associated predictions of distance, time, altitude, speed, fuel, and wind.

In a similar way, the "performance (PERF)" or "flight progression" page contains the useful parameters for guiding the aeroplane in the short term such as the speed to follow, the altitude ceilings, and the next changes in altitude.

The other typical pages available on board are:
The group of lateral and vertical revision pages, which comprise the pages:
  The "Initialization" page for initializing a route and its main parameters
  The "departure" page for inputting the departure procedures
  The "arrival" page for inputting the arrival procedures
  The "airways" page for inputting the list of air highways
  The "Alternate" page for inputting and checking the information on alternate airports
  The page presenting the temporary and secondary flight plans
  The "DIR TO" page for carrying out a direct trajectory to a waypoint
  The page for inputting vertical constraints (altitude, speed, time)
  The "HOLD" page making it possible to input the holding patterns used for example when waiting for a runway to become available. These patterns are also known in the prior art as holding stacks.
  The "Weather" page making it possible to input the wind and temperature information during the various phases of flight The group of the pages of information that comprise the pages:
  The "Data" pages for displaying data linked to elements of the ARINC 424 navigation database. This page comprises a page for stored Routes, a page for "waypoints", a page for "radio beacons", a page for "airports".
  The "Status" pages which give the configuration of the aeroplane.
  The "location" pages which make it possible to know the position of the aeroplane with the various sensors, the accuracy of navigation, the beacons used for navigation etc.
  The "weight management" pages which make it possible to input and check the weights (empty weight, on-board fuel) and the centre of gravity
  The "Route Summary" pages which make it possible to display a summary of the Route or of the mission.

Thus, as all the screens are monopolized by two pages containing a small number of columns, the useful and relevant information of the other pages is not visible.

Figure 4:
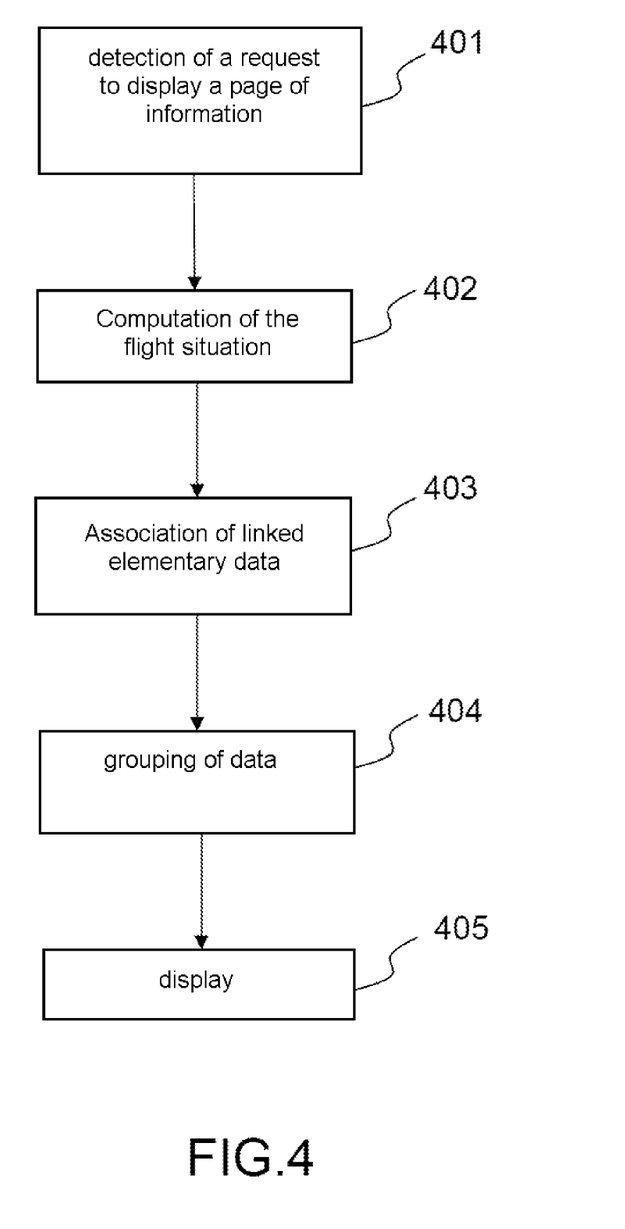
FIG. 4 is a flow chart illustrating a method for summarizing flight plan information according to the present invention.

The method of the invention is presented in FIG. 4. This method makes it possible for providing, on a human-machine interface, data relating to an aspect of the operation of an aircraft and grouped into one and the same area of the interface. This method is implemented by computer and it comprises the steps of
  a step 401 of detecting a request to display an aspect of the operation of the aircraft;
  a step 402 of computing a flight situation and generating a consolidated aeroplane situation;
  a step 403 of associating elementary data linked to the consolidated flight situation to extract therefrom updated situational data;
  a step 404 of grouping the updated situational data into a plurality of sub-sets to allow display of said data in said display area,
  a step 406 of displaying, in said display area, the sub-sets of data.

In this method, the relevant data are extracted by directly employing the links database in step 403, on the basis of the consolidated aeroplane situation (step 402) and the display requests (step 401).

The step 402 of computing the consolidated aeroplane situation carries out the following steps:
The first step consists in recovering the information on the situation in which the aeroplane is evolving.
Typically, one may list:
  the position of the aircraft in space (latitude/longitude/altitude)
  the flight phase in progress
  the next waypoint the predictions on the next waypoints the procedure during flight (i.e. to which the next waypoint belongs)

the procedures can be classed according to the ARINC 424 standard which defines the parameters of a route loaded on-board the aircraft. Typically, a flight plan is composed of terminal procedures (departure and arrival) and procedures used during the flight of the aircraft, in particular to follow the "airways" or air highways (list of waypoints belonging to one and the same section of route)

moreover, the procedures can have requirements of lateral accuracy (RNP/RNAV for example) or vertical accuracy (RVSM for example).

On this basis, a step of determination of elementary situations is carried out. It consists in determining:

The flight phase: on the ground before take-off (taxiing), at take-off, climbing, cruising, descending, approaching the destination, on the ground at destination, go-around The weather situation: short-term problem (weather radar), medium-term problem (AOC, ATC uplink), reception of new wind map, areas to be avoided (eruptions etc.)

The situation of the aeroplane systems: system failures detected, limitations of the communications or monitoring systems, problems influencing the fuel (leaks, engine problems, depressurization, landing gear deployed, flaps deployed)

The ATC situation: diversion negotiation, flight level or flight speed negotiation The airline situation (AOC): behind/ahead of schedule, problem on board (sick passenger etc.) requiring a diversion, route/fuel optimization criterion Surrounding traffic/relief situation: diversion in mountainous region, dense traffic The operational situation: crew turnover, ETOPS flight etc.

Once the elementary situations have been determined, a consolidation phase is operated leading to the "consolidated aeroplane situation". This step can for example order the priorities of the elementary situations (the ">" can mean "higher priority than"):

Aeroplane systems situation>traffic/relief situation>weather situation>ATC situation>operational situation>airline situation>flight phase situation.

In this approach, if there is no failure of the aeroplane system, no traffic/relief problem, no weather problem, but an ATC negotiation is in progress, the consolidated aeroplane situation will be "ATC Situation".

In a variant of implementation, the consolidated aeroplane situation can consist in combining elementary situations.

Preferably, the consolidation can give a consolidated aeroplane situation at take-off (take-off flight phase) which predominates over the other situations except the aeroplane system situation. Then when cruising, the priority returns to the ATC situation, and in descent or approach, the traffic/relief situation can become predominant. Thus, step 402 generates a consolidated aeroplane situation.

The step 403 of associating linked elementary data determines which are the relevant data to extract from the links database, depending on the pages displayed by the crew (display situation), and on the consolidated aeroplane situation. To do this, this step extracts from the links database each data item that is associated with a consolidated aeroplane situation.

Typically, during the flight, in the absence of any modification in progress, the captain displays the active "flight plan" page and the first officer the "performance" page.

Intermittently throughout the flight in order to consult appended operational information, or in order to carry out modifications of the route followed, other pages can be briefly used.

The step 404, of grouping the updated situational data, consists in filtering the beneficial data to be sent to the display. It carries out this filtering by applying the consolidated aeroplane situation data of step 403 and the display situation to the links database.

The display situation represents the pages chosen by the crew and displayed on the various screens in the cockpit (among the 100 available pages).

The link database is a base that makes it possible to link the elementary data to a situation (consolidated aeroplane situation and display situation).

It defines the rules that make it possible to filter the elements that must be displayed when a situation is attained. These rules can be logical combinations (AND/OR/XOR/NOT) of situational data.

A data item is "relevant for display" if the logical combination of the situations is at "TRUE".

This database can be hosted on board the aircraft or on the ground and can be defined either statically, or dynamically (by downloading or manual modification). Thus, this database is entirely paramaterizable.

The step 404 is therefore carried out through the following steps:

Recovery of the display situation: which pages are displayed on the various screens in the cockpit (among the 100 available pages).

Recovery of the consolidated aeroplane situation (flight phase, operational systems and failure systems, surrounding weather, geographical area crossed, (continents, seas . . . ), Then for each item of the database to determine whether this data item is beneficial and must be displayed depending on various situations.

Finally, it determines if it has to:

Replace the data from the "target" page by data from the database

Add data from the database to the "target" page

Finally the display step 406 constructs the resulting page by assembling the information summarized by step 404.

This step incorporates a step of checking the format of the information. Indeed, the size of the page being limited, it is not always possible to display the entirety of the sub-sets on a single page.

In this case several solutions are envisaged (they can be incorporated into a strategy defined statically or dynamically in the database, or parameterizable by the crew of the aircraft or by the ground personnel).

Solution 1: re-cut the sub-sets when possible. For example, if 10 rows are available on the page and a decision is made to display 3 sub-pages, a check is made that the sum of the sub-pages does not exceed 10. If such is the case, multi-row sub-pages can be re-cut when the display of a few rows less does not impede understanding.

Example: it is possible to remove a few rows from the flight plan sub-page, as long as two points are retained (the point that has been sequenced and the point ahead of the aeroplane).

Solution 2: The crew can be alerted that not everything can be represented and that it is necessary to choose (statically or dynamically) which page can be ignored: this is equivalent to incorporating relative priorities between pages.

Solution 3: For the pages whose displays can be defined by the captain (display situation), it is possible to offer in the menus of sub-page choices only those with a number of rows making it possible to guarantee that the size of the page is not exceeded given the other sub-pages displayed.

Figure 5:
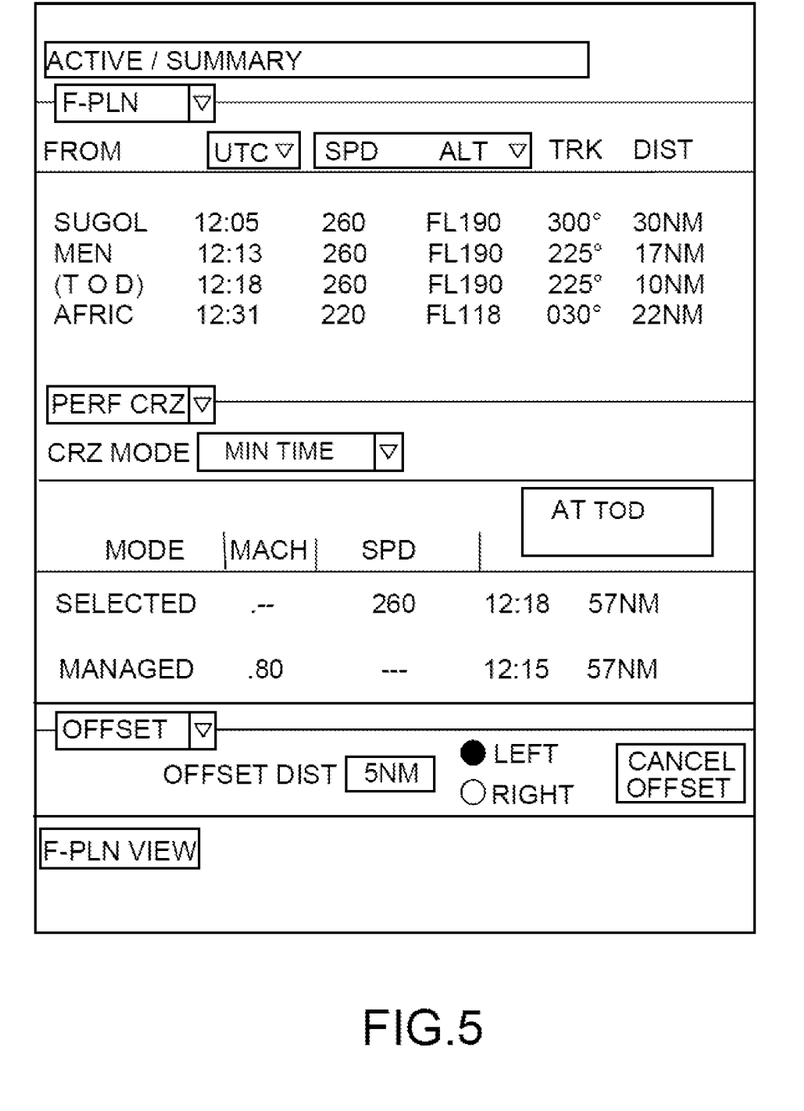
FIG. 5 presents a page of the human-machine interface that concatenates the information of several other pages.

FIG. 5 represents in the upper part (also known by the acronym FPLN for "Flight Plan")
  A summary of the FPLN page, namely the 4 next characteristic points of the flight plan (2 waypoints, plus the point at which cruising ends (known by the acronym TOD for Top of Descent) and the 1$^{st}$ point in descent.
  A summary of the predictions of time UTC, of speed denoted SPD, of altitude denoted ALT, of Track denoted TRK and of Distance denoted DIST is displayed.

The central part represents a summary of the PERFORMANCE page indicating the optimum speed mode chosen (MIN TIME for Minimum Time), and information on the current speed mode (it can be seen that it is different from the optimal mode because the speed selected by the aircraft is 260 kts (SELECTED row), whereas the optimal speed indicated is Mach 0.80 (MANAGED row). The repercussions on the time of arrival at the TOD are displayed on the right.

The lower part is a summary of the Offset page, indicating that the craft is currently flying at 5 NM to the left of the filed flight plan.

The 3 parts are selectable by the captain as indicated by the small arrow that leads to a scrolling menu.

Figure 6:
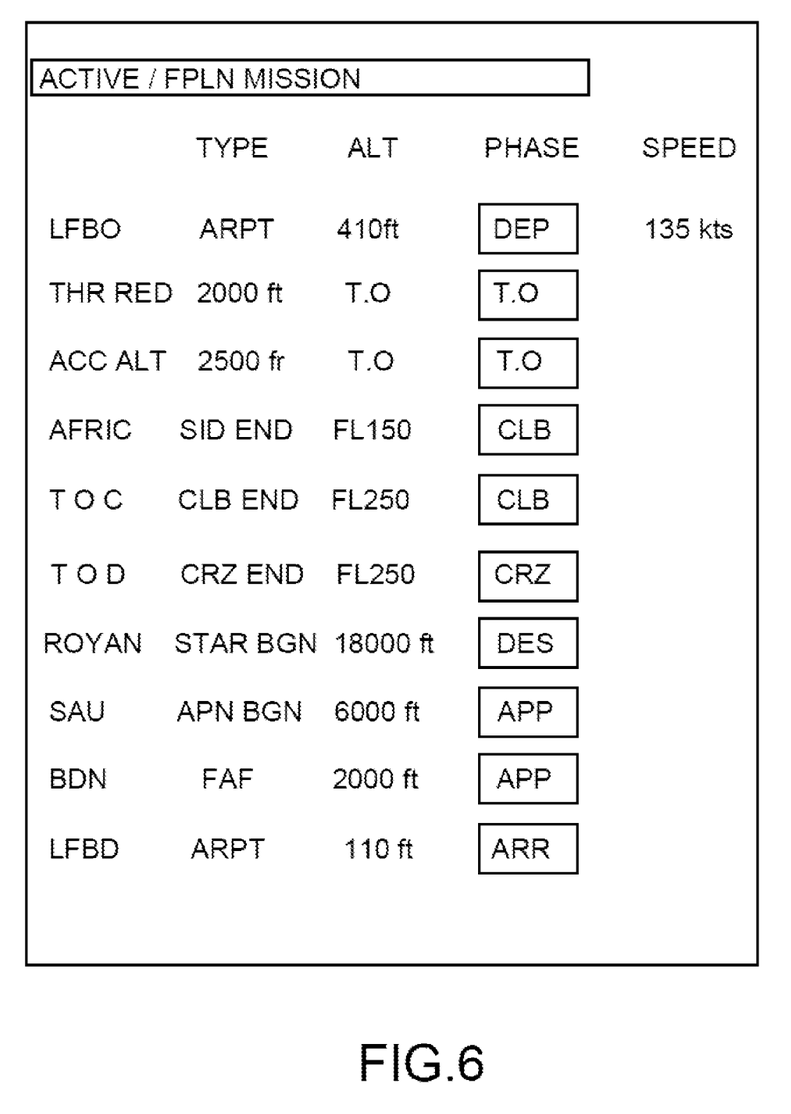
FIG. 6 presents a mission summary page which lists the series of procedures corresponding to the flight plan.

FIG. 6 presents the summarized information of the flight plan which is displayed on this page:
  For each element, the type of element
    ARPT=airport,
    SID END=end of published ascent procedure,
    CLB END=end of ascent (i.e. start of cruise),
    CRZ END=end of cruise (i.e. start of descent),
    STAR BGN=departure point of the published descent procedure,
    APP BGN=departure point of the published approach,
    FAF=Final Approach Fix=departure point of the segment of final approach.

The altitude and speed indications are given, as well as shortcuts to the most appropriate pages:
  DEP=shortcut to the departure page (Departure)
  ARR=shortcut to the arrival page (ARRIVAL)
  T.O=shortcut to the take-off performance page (PERF TO)
  Ditto for CLB, CRZ, DES, APP.

Figure 7:
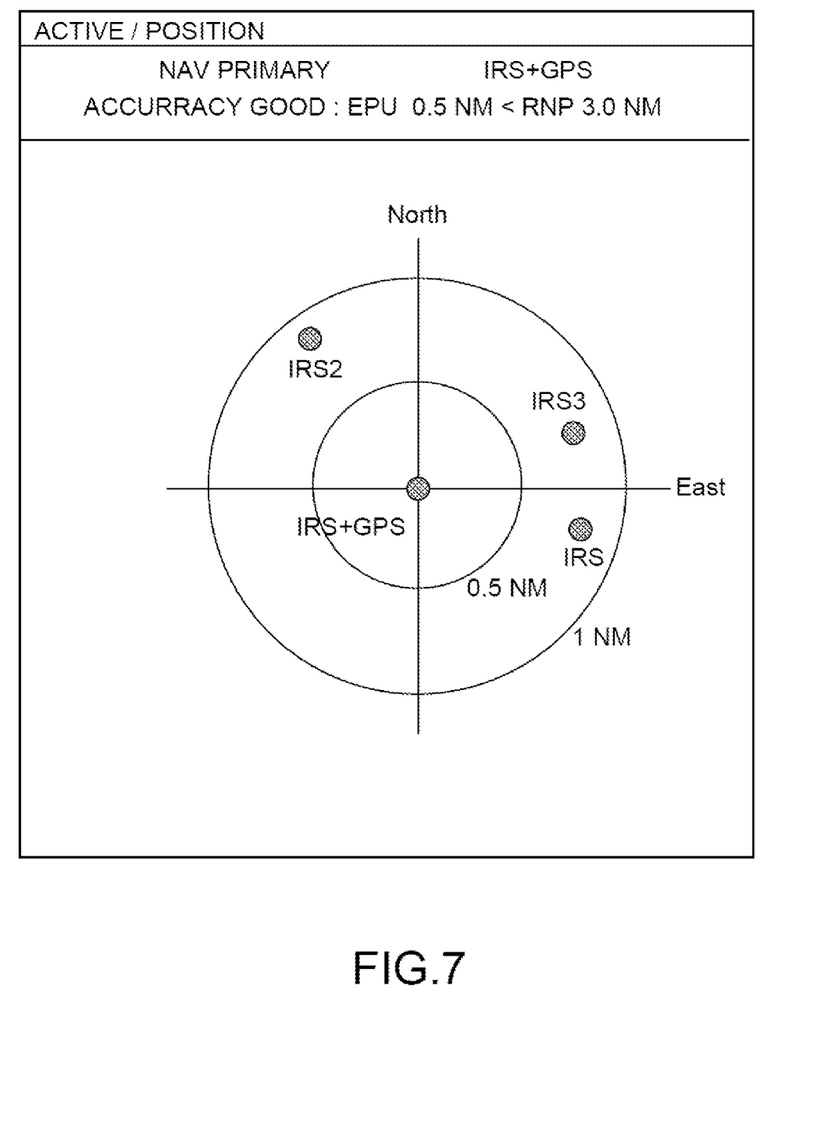
FIG. 7 presents an example of the "location" page.

FIG. 7 presents the information on the aeroplane position:
Above:
  The navigation quality "NAV PRIMARY", and the mode of navigation of the current aeroplane "IRS+GPS" which indicates that there is a hybridization of the information received from the inertial platform functions and the information received from the GPS
  The accuracy is correct "ACCURACY GOOD" because the uncertainty on the position error that is of 95% (known as "EPU" for "Estimated Position Uncertainty") is smaller than the accuracy required on the flight plan part during flight ("RNP"="Required Navigation Performance")
  The part underneath graphically indicates the relative positions of the various sensors (the 3 inertial platforms), along the North and East axes, with a chosen zoom of 1 NM.

Moreover, in an embodiment, the step 404 is defined in the following way:
For the Mission/Data mission n° X page: (i.e. on the row n° X)
  Consolidated aeroplane situation="TO waypoint belongs to the procedure X" (the "TO waypoint" denotes the next waypoint of the flight plan)
  Display situation="Mission Page not displayed" AND "flight plan page displayed"
  "Relevant data Mission/X"="consolidated aeroplane situation" AND "display situation".

In this way an attempt is made to display the significant points of the MISSION, i.e. the points of change of procedure, on the "flight plan" page, when the Mission page is not displayed.

For the Location/Performance page of current navigation:
  Consolidated aeroplane situation="RNP defined on the leg in progress" (the RNP for "Required Navigation Performance" represents the accuracy and integrity requirement to be held in lateral positioning,
  Display situation="Location page not displayed" AND "flight plan page displayed"
  "Relevant data Perf Nav"="Consolidated aeroplane situation" AND "display situation"

Thus, if the navigation performance page is not displayed, the relevant navigation data such as the value of RNP is transferred to another page.

For the Location/Location means page
  Consolidated aeroplane situation="Flight phase=Take-off" OR "Flight phase=Landing"
  Display situation="Location page not displayed" AND "flight plan page displayed"
  "Relevant data M Loc"="Consolidated aeroplane situation" AND "display situation"

Thus, if the Location page is not displayed, the location means or device that is used during the take-off or landing phase is transferred to the "flight plan" page (this means denotes the radio beacon to be used as well as the associated data such as its frequency for example).

Thus the step 404 of grouping the updated situational data into a plurality of sub-sets is performed in the following way:
  If "Relevant data Mission/X"=TRUE then: replace the points of the procedure after the TO on the "flight plan" page by the Mission X data. Replace the points of the procedure after the procedure X by their equivalent mission data.
  If "Relevant data Perf Nav"=TRUE, ADD the data "Current navigation performance" to the "Performance" page if displayed, and to the "flight plan" otherwise.
  If "Relevant data M Loc"=TRUE, ADD the data "Location means used" to the "Performance" page if displayed, and to "flight plan".

Advantageously, the method makes it possible to use hyperlink technology (for example of HTML type) to access an element.

Thus the present description illustrates a preferred implementation of the invention, but is not limiting. Examples have been chosen to allow a good understanding of the principles of the invention, and a concrete application, but are in no way exhaustive and must allow those skilled in the art to contribute modifications and variant implementations while keeping the same principles.

The present invention can be implemented on the basis of hardware and/or software elements. It can be available as a computer program product on a computer-readable medium. The medium can be electronic, magnetic, optical, electromagnetic or be a broadcasting medium of infrared type.

Such media are, for example, semi-conductor memories (Random Access Memory RAM, Read-Only Memory ROM), or tapes, or magnetic or optical diskettes or disks (Compact Disc-Read Only Memory (CD-ROM), Compact Disc-Read/Write (CD-R/W) and DVD).

The invention claimed is:

1. A method implemented by computer for providing, into one and a same area of a human-machine interface coupled to a flight management system, data relating to an aspect of an operation of an aircraft, the method comprising the steps of:
    detecting by the flight management system a display situation request to display an aspect of the operation of the aircraft, the display situation representing several pages to be displayed on various screens of the aircraft;
    recovering by the flight management system information on a flight situation of the aircraft and an environment in which the aircraft evolves to determine elementary situations for the aircraft;
    generating by the flight management system a consolidated aeroplane situation by combining or ordering the elementary situations;
    determining by the flight management system from the requested display situation and the consolidated aeroplane situation a set of situational data;
    filtering by the flight management system the set of situational data to determine a plurality of sub-sets of situational data, wherein each sub-set comprises relevant data related to said aspect of the operation of the aircraft to be displayed; and
    building a page from the plurality of sub-sets for the display of one or more sub-sets in one and the same display area of said human-machine interface.

2. The method according to claim 1, wherein the grouping step allows removing updated situational data from certain sub-sets when a quantity of updated situational data exceeds a display capacity of the human-machine interface.

3. The method according to claim 2, wherein the grouping step allows, when an aspect of an operation of an aircraft concerns a flight plan, displaying only the data relating to two waypoints of said flight plan, the waypoint that has been reached and a next waypoint.

4. The method according to claim 1, wherein the displaying step allows alerting a crew if the quantity of updated situational data exceeds a display capacity of the human-machine interface and choosing one or several sub-sets that are not to be displayed on the human-machine interface.

5. The method according to claim 1, wherein the displaying step allows offering display of only the sub-sets whose quantity of updated situational data does not exceed a display capacity of the human-machine interface, taking into account other sub-sets that are to be displayed on the human-machine interface.

6. A system for providing, on a human-machine interface, data relating to an aspect of an operation of an aircraft and grouped into one and a same area of said interface, the system comprising the human-machine interface and a flight management system configured to implement means for implementing the steps of the method according to claim 1.

7. A non-transitory computer program product, said non-transitory computer program product comprising code instructions to carry out the steps of the method according to claim 1, when said program is executed on a computer.

8. A system for providing, on a human-machine interface, data relating to an aspect of an operation of an aircraft and grouped into one and a same area of said interface, the system comprising the human-machine interface and a flight management system configured to implement the steps of the method according to claim 2.

9. A non-transitory computer program product, said non-transitory computer program product comprising code instructions to carry out the steps of the method according to claim 2, when said program is executed on a computer.

10. A system for providing, on a human-machine interface, data relating to an aspect of an operation of an aircraft and grouped into one and a same area of said interface, the system comprising the human-machine interface and a flight management system configured to implement the steps of the method according to claim 3.

11. A non-transitory computer program product, said non-transitory computer program product comprising code instructions to carry out the steps of the method according to claim 3, when said program is executed on a computer.

12. A system for providing, on a human-machine interface, data relating to an aspect of an operation of an aircraft and grouped into one and a same area of said interface, the system comprising the human-machine interface and a flight management system configured to implement the steps of the method according to claim 4.

13. A non-transitory computer program product, said non-transitory computer program product comprising code instructions to carry out the steps of the method according to claim 4, when said program is executed on a computer.

14. A system for providing, on a human-machine interface, data relating to an aspect of an operation of an aircraft and grouped into one and a same area of said interface, the system comprising the human-machine interface and a flight management system configured to implement the steps of the method according to claim 5.

15. A non-transitory computer program product, said non-transitory computer program product comprising code instructions to carry out the steps of the method according to claim 5, when said program is executed on a computer.

* * * * *